United States Patent [19]

Wilson

[11] 4,133,177
[45] Jan. 9, 1979

[54] VARIABLE FILL FLUID COUPLING CONTROL MEANS

[75] Inventor: Nelson H. Wilson, Brownsburg, Ind.

[73] Assignee: Indian Head Inc., New York, N.Y.

[21] Appl. No.: 864,760

[22] Filed: Dec. 27, 1977

[51] Int. Cl.² ............................................. F16D 33/06
[52] U.S. Cl. .................................. 60/358; 60/DIG. 2
[58] Field of Search ............ 60/358, 357, 327, DIG. 2

[56] References Cited

U.S. PATENT DOCUMENTS

| 3,210,940 | 10/1965 | Bunnelle | 60/358 |
| 3,237,408 | 3/1966 | Bunnelle et al. | 60/358 |
| 3,862,541 | 1/1975 | Bunnelle | 60/358 |

*Primary Examiner*—Edgar W. Geoghegan
*Attorney, Agent, or Firm*—Brumbaugh, Graves, Donohue & Raymond

[57] ABSTRACT

The combination of a variable fill fluid coupling with a control means therefor is improved by providing the combination with a control means which comprises an interconnected series of a pressure transducer, an electrical controller and an electro-proportional linear solenoid.

2 Claims, 2 Drawing Figures

VARIABLE FILL FLUID COUPLING CONTROL MEANS

BACKGROUND OF THE INVENTION

1. Field of the Invention

The present invention relates to the combination of a variable fill fluid coupling and an improved control means therefor.

2. Incorporation by Reference

The entire disclosures of U.S. Pat. Nos. 3,210,940; 3,237,408 and 3,862,541, including the drawings thereof, are hereby incorporated by reference herein.

3. Description of the Prior Art

The aforementioned patents relate to combinations comprising a variable fill fluid coupling for coupling a constant speed drive motor to a driven centrifugal pump having a discharge conduit, the fluid coupling having a compression spring-loaded pivotal charging stream splitter assembly, and a control means for controlling the movement of the splitter assembly responsive to pressure change in the discharge conduit. The preferred construction of the mechanism which controls movement of the splitter assembly incorporates a form of diaphragm or bellows assembly within which a fluid under pressure may act. This fluid is generally gathered from the discharge conduit at a location near the discharge end of the pump connected to the fluid coupling and transmitted to the bellows assembly via tubing called a pressure control line. A plunger or rod connected to the bellows on one end and engaging the splitter assembly at the other end causes the splitter assembly to move about a fixed pivot in response to motion of the bellows created by increase or decrease of fluid pressure in the discharge conduit.

A further essential feature of the control mechanism disclosed in the aforementioned patents is the externally adjustable compression spring. The spring provides a force on the splitter arm of the splitter assembly in opposition to the force created by fluid pressure acting on the bellows and transmitted to the splitter arm via the connecting plunger or rod. The spring force is made adjustable to allow for manual selection of equilibrium positions of the splitter mechanism with respect to a desired fluid pressure acting on the bellows. When the opposing forces of the compression spring and the bellows assembly are established in equilibrium, the diverting portion or vane of the splitter assembly may be located at any position across the coupling oil charging stream or jet, such that the volume of oil entering the coupling will establish an output torque to drive the connected centrifugal pump at a speed which will yield a certain pump volumetric flow rate at the selected pressure. Changes in fluid pressure acting on the bellows alters the equilibrium forces on the splitter assembly such that the oil stream is intercepted in a greater or lesser degree which in turn affects the output speed inversely to the control pressure direction.

The preferred construction of the control mechanism utilizing fluid pressure feedback to a bellows assembly to create coupling response is useful only when the fluid pressure signal is taken from a source near the fluid coupling. Protection of long lengths of fluid carrying tubing from damage, leakage integrity and losses in pressure signal strength are some of the problems with remote pressure sensing via pressure control lines described in the aforementioned patents. To allow use of the variable speed device named with remote pressure sensing, a system has been commonly employed which utilizes a pressure transducer, a signal processing center, an air compressor and tank, and an electrically operated solenoid valve.

The commercial tank and air compressor supplies an independent fluid (air) pressure to apply at the coupling bellows assembly, the solenoid valve varies the air pressure in response to electrical signal changes from the controller which receives a functional signal from the transducer. The transducer signal is generated in varying strength in proportion to fluid pressure changes at the sensing location. This combination has had several problems.

1. The tank and air compressor take up valuable space as well as adding to the electrical energy use of the equipment.

2. Reliability and accuracy of the speed changing signal is impaired by too many translations, i.e., hydraulic to electrical at the transducer, electrical to mechanical at the solenoid valve, mechanical to fluid at the air compressor-solenoid combination and fluid back to mechanical at the coupling.

3. The commercial tank and air compressor used produce a usable air signal strength of 3–15 psi. The commercial compression springs used in the coupling control mechanism have a plus or minus 10% tolerance on the selected spring rate. With the low signal pressure value and low range available, the wide spring rate tolerance makes the control of speed between two or more parallel operating couplings very difficult due to mismatched control mechanism forces.

4. For the reasons stated in (3) above, a shift in the spring rate to a lower value, with the low end pressure value on the bellows, sometimes causes the control mechanism to flutter, resulting in unstable speed control.

5. The use of air as a pressurized working fluid has created special problems with leakage at connections and joints.

SUMMARY OF THE INVENTION

The object of the present invention is to provide an improvement in the control means for a variable fill fluid coupling so as to eliminate the aforementioned difficulties when the variable fill fluid coupling is preferably used with remote pressure sensing transducers that convert fluid pressure into electrical signals of varying strength proportional to the value of fluid pressure encountered.

The present invention has as a basis a combination comprising (a) a variable fill fluid coupling for coupling a constant speed drive motor to a driven centrifugal pump having a discharge conduit, the fluid coupling having a compression spring-loaded pivotal charging stream splitter assembly, and (b) a control means for controlling the movement of the splitter assembly responsive to pressure change in the discharge conduit. The improvement provided by the present invention lies in the control means which comprises ($b_1$) a pressure transducer or pressure transmitter connected to the discharge conduit for sensing a pressure change in the discharge conduit and converting the sensed pressure change into an electrical input signal, ($b_2$) an electrical controller connected to the pressure transducer for receiving the electrical input signal and providing a responsive electrical output signal and ($b_3$) an electro-proportional linear solenoid connected, on the one hand, to the electrical controller for receiving and responding to the electrical output signal and operatively engageable, on the other hand, with the splitter assembly.

DESCRIPTION OF THE PREFERRED EMBODIMENT

Figure 1:
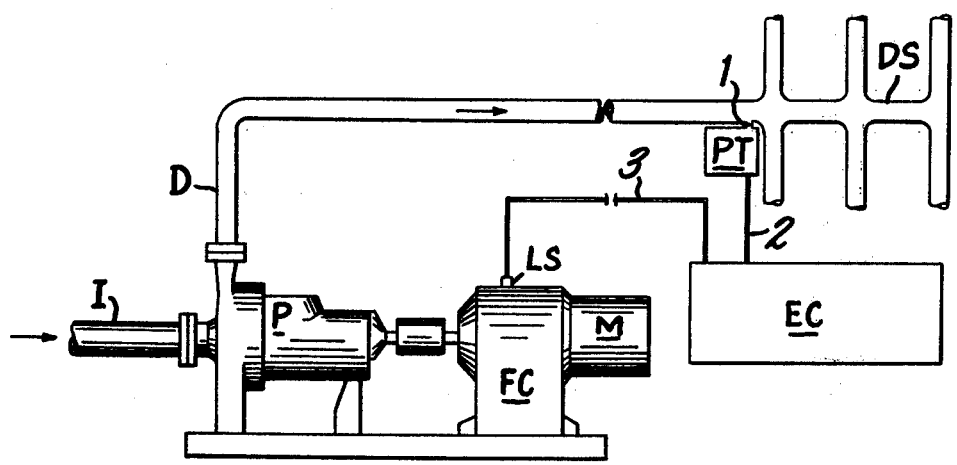
FIG. 1 is a schematic view of the improved combination of the invention.
Figure 2:
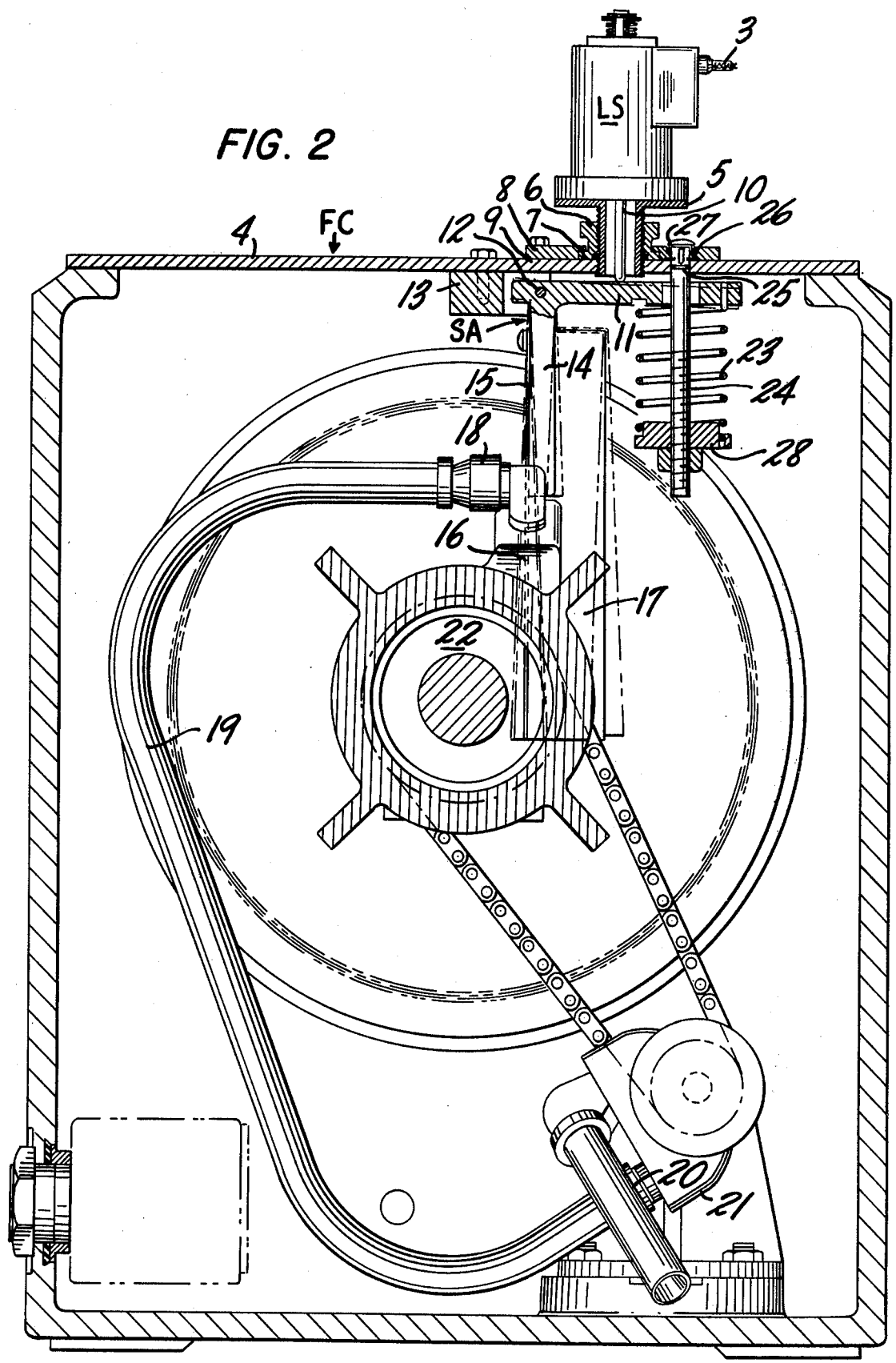
FIG. 2 is a sectional view corresponding to FIG. 3 of U.S. Pat. No. 3,862,541 but having an electro-proportional linear solenoid and having a compression spring without an external adjustment knob.

Referring to FIG. 1, the combination of the invention comprises a variable fill fluid coupling FC which can be any of the types disclosed in the aforementioned patents as modified by the improved control means of the present invention. The variable fill fluid coupling FC couples together a constant speed drive motor M to a driven centrifugal pump P having a fluid (e.g., water) inlet conduit I and having a discharge conduit D which leads to a distribution system DS. The fluid coupling FC has a compression spring-loaded pivotal charging stream splitter assembly SA as shown in FIG. 2 and discussed hereinafter.

The combination further comprises a control means for controlling the movement of the splitter assembly SA responsive to pressure change in the discharge conduit D. In accordance with the present invention, the improved control means comprises a pressure transducer or pressure transmitter PT (e.g., Model No. S2010, Systecon Division, Corporate Equipment Co.) connected via line 1 to the discharge conduit D (at a location either near or, preferably, remote from the centrifugal pump P) for sensing a pressure change in the discharge conduit D and converting the sensed pressure change into an electrical input signal. An electrical controller EC (e.g., receiver/controller No. S9401 and drive module No. S9003, Systecon Division, Corporate Equipment Co.) is electrically connected via line 2 to the pressure transducer PT for receiving the electrical input signal and providing a responsive electrical output signal. A unidirectional electro-proportional linear solenoid LS (e.g., Model No. 185300-001, Ledex, Inc.) is electrically connected via feedback line 3 to the electrical controller EC for receiving and responding to the electrical output signal and is operatively engageable with the splitter assembly SA.

Although, as noted above, the improved control means of the present invention can be used with any of the variable fill fluid couplings of the aforementioned patents, it will be further described hereinafter in regard to the variable fill fluid coupling of U.S. Pat. No. 3,862,541 and in particular in reference to FIG. 2 hereof which is a sectional view corresponding to FIG. 3 of that patent with the modifications noted below. Referring to FIG. 2, the electro-proportional linear solenoid LS is mounted on the cover plate 4 of the variable fill fluid coupling FC via a solenoid adaptor 5, a locking nut 6, a thread seal 7, a clamping plate 8 and a gasket 9. The linear solenoid LS has a spring returned linearly movable stroke rod or armature 10 which is actuated by the electrical output signal received via the feedback line 3 from the electrical controller EC. The stroke rod 10 is vertically movable and is operatively engageable with the splitter lever arm 11 of the splitter assembly SA.

The splitter assembly SA is pivotally mounted on a pivot pin 12 within a U-shaped pivot block 13. Depending perpendicularly from the lever arm 11 is a mounting leg 14 having a splitter vane 15 of angular shape attached thereto. A leg 16 of the splitter vane 15 is aligned in a plane which includes the pivotal axis of the pivot pin 12 while another vane leg 17 extends perpendicularly thereto. The splitter vane 15 extends downward to a level below a discharge orifice (not shown) of an inclined nozzle passage (not shown) attached in series to a fitting 18, a hose 19, a fitting 20 and a charging liquid (oil) circulating pump 21 and is arranged to swing transversely between the discharge orifice and a mouth 22 for an active liquid (oil) chamber (not shown) to block a portion of the charging liquid stream from the nozzle passage.

When an increase in pumping pressure in the discharge conduit D is detected by the pressure transducer PT, the electrical controller EC sends an output signal to the linear solenoid LS which causes the stroke rod 10 to be projected downward engaging the splitter lever arm 11 and causing the splitter assembly SA to pivot about the axis of the pivot pin 12 in the pivot block 13. As pressure in the discharge conduit D is reduced, the electrical controller Ec stops sending an output signal to the linear solenoid LS so that the spring returned stroke rod 10 retracts and allows the splitter lever arm 11 to move upwardly under the urging of a compression spring 23. An adjusting screw 24 encircled by an O-ring 25 and a retaining ring 26 extends through an opening in the cover plate 4 and through an opening in the splitter lever arm 11. A button plug 27 (rather than an external adjustment knob) is fixed to the upper end of the adjusting screw 24 while the opposite end of the adjusting screw 24 is threaded to receive a stop plate 28. The compression spring 23 fits between the stop plate 28 and the lever arm 11 to urge the lever arm 11 upwardly.

Only an initial adjustment of the compression spring 23 is needed to create a minimal opposing force on the splitter lever arm 11 against which the initiating force and current value of the linear solenoid LS may be established for the first desired position of the splitter assembly SA. An external adjustment knob for change of compression spring forces is not needed, since the unit is now operating against a relatively fixed force curve generated by the linear solenoid LS regardless of the magnitude and range of fluid (water) pressures in the discharge conduit D sensed by the pressure transducer PT.

The stroke rod 10 of the linear solenoid LS need not be directly engageable with the splitter lever arm 11 of the splitter assembly SA. Thus, there could be interposed therebetween a diaphragm and piston assembly (not shown).

It will be appreciated that various modifications and changes may be made by those skilled in the art without departing from the essence of the invention and accordingly the invention is to be limited only within the scope of the appended claims.

What is claimed is:

1. In a combination comprising (a) a variable fill fluid coupling for coupling a constant speed drive motor to a driven centrifugal pump having a discharge conduit, said fluid coupling having a compression spring-loaded pivotal charging stream splitter assembly, and (b) a control means for controlling the movement of the splitter assembly responsive to pressure change in said discharge conduit, the improvement wherein the control means comprises ($b_1$) a pressure transducer connected to said discharge conduit for sensing a pressure change in the discharge conduit and converting said sensed pressure change into an electrical input signal, ($b_2$) an electrical controller connected to said pressure transducer for receiving said electrical input signal and providing a responsive electrical output signal and ($b_3$) an electro-proportional linear solenoid connected, on the one hand, to said electrical controller for receiving and responding to said electrical output signal and operatively engageable, on the other hand, with said splitter assembly.

2. The improved combination defined by claim 1 wherein the pressure transducer is connected to said discharge conduit at a location remote from said centrifugal pump.

* * * * *